Patented July 25, 1944

2,354,234

UNITED STATES PATENT OFFICE 2,354,234

DISUBSTITUTED MALONIC ESTER AND PROCESS OF PREPARING THE SAME

Lewis A. Walter and Louis H. Goodson, East Orange, N. J., assignors to The Maltbie Chemical Company, Newark, N. J., a corporation of New Jersey No Drawing. Application May 6, 1942, Serial No. 441,972

25 Claims. (Cl. 260—481)

The present invention relates to certain new and useful compositions of matter, namely disubstituted malonic esters having the formula:

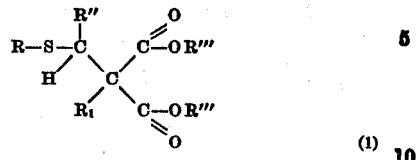

(1)

wherein R, R', and R'' are hydrocarbon groups, either saturated or unsaturated, and either the same or different, and each containing not more than six carbon atoms, and wherein the sum of the carbon atoms in R, R' and R'' does not exceed 10; and wherein R has a carbon atom directly attached to the sulfur atom of the thiocarbinyl group

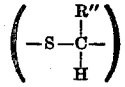

and wherein each R''' is a lower alkyl group; and the invention also relates to a process for preparing the aforesaid compounds.

These novel compounds have been found to be useful intermediates, particularly in the preparation of barbituric acid derivatives, including novel compounds of that class having useful sedative and hypnotic properties.

Our new malonic esters may be prepared by condensing an α-chloro sulfide, of the type

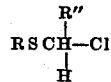

(in which R and R'' have the significance stated above) with a sodium malonic ester of the type:

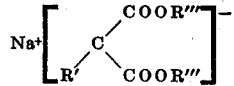

(in which R' and R''' have the significance stated above), in the presence of an organic solvent such as toluene, and under appropriate conditions of temperature, such as those which are hereafter fully described and illustrated in the examples given below, and preferably between about —10° C. and 5° C. When the reaction is complete, the solvent is removed by distillation and the desired malonic ester is recovered from the residue by fractional distillation under reduced pressure.

The following specific examples, employing the foregoing general method of preparation, are illustrative of the invention. All of the esters described by way of illustration are colorless or slightly tinted liquids.

EXAMPLE 1 n-Butylthioethylidene ethyl malonic ester

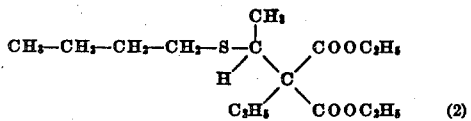

(2)

To 0.3 mole of metallic sodium dissolved in 150 cc. absolute alcohol is added 0.3 mole of ethyl malonic ester. The alcohol is removed in a vacuum, 200 cc. dry toluene is added, and the mixture is stirred and cooled to 0° to 5° C. during the dropwise addition of 0.31 mole of n-butyl-(α-chloroethyl) sulfide. After standing over night at room temperature, the mixture is warmed on a water bath until it no longer gives a basic test with moist litmus. The toluene solution is then washed with water and fractionally distilled to give n-butylthioethylidene ethyl malonic ester, boiling at approximately 116–117° at a pressure of 0.6 mm. of mercury (75% to 85% yield).

EXAMPLE 2

Ethylthioisobutylidene ethyl malonic ester

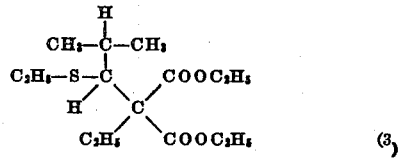

(3)

One mole of ethyl mercaptan is chilled to —10° C. and vigorously stirred while one mole of isobutyraldehyde is added drop by drop over a period of 2 to 3 hours. At the same time, a stream of hydrogen chloride is passed into the mixture and the temperature is kept below 0° C. by external cooling. When addition of the aldehyde is complete, and hydrogen chloride is no longer rapidly absorbed, the aqueous layer is separated and the oily layer is dried at 0° C. with 25–30 grams of anhydrous calcium chloride. The calcium chloride is then filtered off and the product is aerated under reduced pressure to remove hydrogen chloride. It is then added immediately to a solution of 0.6 mole of sodioethyl malonic ester in 300 cc. of toluene at a temperature not exceeding 5° C. The mixture is stirred until the reaction is complete; then the toluene solution is washed with water and distilled to give ethylthioisobutylidene ethyl malonic ester, which boils at approximately 110–112° at a pressure of 1.2 mm. of mercury.

The yield, based on mercaptan, varies from about 30% to 50%.

EXAMPLE 3

*Isopropylthiopropylidene ethyl malonic ester*

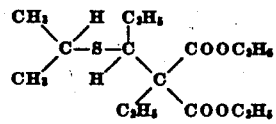
(4)

One mole of isopropyl mercaptan is chilled to −10° C. and is vigorously stirred while one mole of n-propionaldehyde is added drop by drop over a period of about 2 to 3 hours. At the same time, a stream of hydrogen chloride is passed into the mixture and the temperature is kept below 0° C. by external cooling. When addition of the aldehyde is complete, and hydrogen chloride is no longer rapidly absorbed, the aqueous layer is separated and the oily layer is dried at 0° C. with 20–30 grams of anhydrous calcium chloride. The calcium chloride is removed by filtration, and the product is aerated under reduced pressure to remove hydrogen chloride. It is then added immediately to a solution of 0.6 mole of sodioethyl malonic ester in 300 cc. toluene at a temperature not exceeding 5° C. The mixture is stirred until the reaction is complete; then the toluene solution is washed with water and distilled to give the desired ester, which has a boiling point of approximately 104–106° C. at a pressure of 1.2 mm. of mercury. The yield, based on mercaptan, is about 25% to 35%.

EXAMPLE 4

*Allylthioethylidene isobutyl malonic ester*

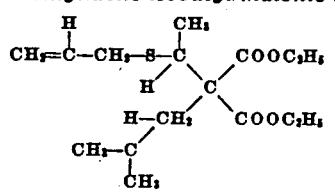
(5)

A mixture of one mole of allyl mercaptan and 0.33 mole of paraldehyde is chilled to −10° C. and is then rapidly stirred while a stream of hydrogen chloride is passed into the mixture at such a rate that the temperature does not rise above 0° C. When hydrogen chloride is no longer rapidly absorbed, the aqueous layer is separated and the product is dried with 20–30 grams of calcium chloride at 0° C. The calcium chloride is removed by filtration; the product is aerated under reduced pressure to remove hydrogen chloride, and is then added immediately to a solution of one mole of sodioisobutyl malonic ester in 500 cc. of toluene, while maintaining the temperature below 5° C. The mixture is then stirred until the reaction is complete; then the toluene solution is washed with water and fractionally distilled to give the desired ester, which has a boiling point of approximately 110–112° at a pressure of 1 mm. of mercury, and with a yield of about 60% to 70%.

The following disubstituted malonic esters, which we have prepared, including the examples given above, are embodiments of our invention, and are illustrative of the generic class of compounds described and claimed herein, it being understood, however, that the generic class of compounds is not limited to the ethyl esters, but includes esters in which R''' is a lower alkyl group.

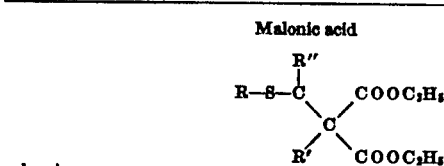

Malonic acid wherein:

| R is— | R' is— | R'' is— | Approximate boiling point, °C. | Pressure (approx.) in mm. of mercury |
|---|---|---|---|---|
| Methyl | n-Propyl | Methyl | 99–101 | 1 |
| Ethyl | n-Hexyl | do | 140–145 | 2 |
| Do | Ethyl | n-propyl | 105–108 | 1 |
| Do | do | Isopropyl | 110–112 | 1.2 |
| Do | do | 2-pentyl | 124–127 | 1.3 |
| Do | do | 1-propenyl | 131–135 | 1.2 |
| Isopropyl | do | Ethyl | 104–106 | 1.2 |
| Do | n-Propyl | Methyl | 106–108 | 1.4 |
| Allyl | Isobutyl | do | 110–112 | 1 |
| n-Butyl | Ethyl | do | 116–117 | 0.6 |
| Do | do | Ethyl | 126–129 | 1.2 |
| Do | n-Propyl | Methyl | 127–129 | 1 |
| Do | Isopropyl | do | 119–120 | 1.4 |
| Do | Allyl | do | 135–137 | 1.5 |
| n-Amyl | Ethyl | do | 129–130 | 1 |
| Isoamyl | do | do | 114–116 | 0.5 |
| Cyclohexyl | Methyl | do | 139–141 | 1.3 |

In the foregoing examples, the boiling points are approximate, and at about the pressures given; but are boiling points which we actually observed, according to a procedure believed to be reliable.

Procedures suitable for making α-chlorosulfides suitable for use as starting materials in the preparation of disubstituted malonic esters according to this application (e. g. α-chloroethyl sulfides) are disclosed in our co-pending application Serial No. 441,971, filed May 6, 1942, for "α-Chloroethyl sulfides and process of preparing the same." Other such procedures are disclosed in Examples 2, 3 and 4 above.

The examples given above, and illustrative processes for their production, include the best embodiments of our present invention now known to us; but it is to be understood that the invention is not necessarily or specifically limited thereto, and may, under proper circumstances, have other embodiments, produced in other ways, without departure from the spirit of the invention, and within the scope of the following claims.

We claim:
1. As a new and useful chemical compound, a disubstituted malonic ester having the formula:

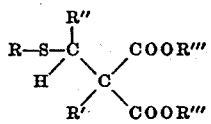

wherein R, R' and R" are hydrocarbon groups each of which contains not more than six carbon atoms, and wherein the sum of the carbon atoms in R, R' and R" does not exceed 10; and wherein R has a carbon atom directly attached to the sulfur atom of the thiocarbinyl group; and wherein each R''' is a lower alkyl group.

2. A disubstituted malonic ester according to claim 1 wherein R, R and R' are all saturated groups.

3. A disubstituted malonic ester according to claim 1 wherein R, R' and R" are primary hydrocarbon groups.

4. A disubstituted malonic ester according to claim 1 wherein R, R' and R" are all primary, saturated hydrocarbon groups.

5. A disubstituted malonic ester according to claim 1 wherein R and R' are primary hydrocarbon groups and R" is a methyl group.

6. A disubstituted malonic ester according to claim 1 wherein R and R' are both primary, saturated hydrocarbon groups and R" is a methyl group.

7. A disubstituted malonic ester according to claim 1 wherein R is a primary, saturated hydrocarbon group containing four carbon atoms, R' is a primary hydrocarbon group, and R" is a methyl group.

8. A disubstituted malonic ester according to claim 1 wherein R is a primary, saturated hydrocarbon group containing four carbon atoms, R' is a primary, saturated hydrocarbon group, and R" is a methyl group.

9. A disubstituted malonic ester according to claim 1 wherein R is a primary hydrocarbon group, R' is an ethyl group, and R" is a methyl group.

10. A disubstituted malonic ester according to claim 1 wherein R is a primary, saturated hydrocarbon group, R' is an ethyl group, and R" is a methyl group.

11. A disubstituted malonic ester according to claim 1 wherein R is a primary, saturated hydrocarbon group containing four carbon atoms, R' is an ethyl group, and R" is a methyl group.

12. A disubstituted malonic ester according to claim 1 wherein R is a secondary hydrocarbon group, and R' and R" are primary hydrocarbon groups.

13. A disubstituted malonic ester according to claim 1 wherein R is a secondary hydrocarbon group, and R' and R" are both primary, saturated hydrocarbon groups.

14. A disubstituted malonic ester according to claim 1 wherein R is a secondary hydrocarbon group, R' is a saturated, primary hydrocarbon group, and R" is a methyl group.

15. A disubstituted malonic ester according to claim 1 wherein R is a saturated, secondary hydrocarbon group, R' is a saturated, primary hydrocarbon group, and R" is a methyl group.

16. A disubstituted malonic ester according to claim 1 wherein R and R' are both primary hydrocarbon groups, and R" is a secondary hydrocarbon group.

17. A disubstituted malonic ester according to claim 1 wherein R and R' are both saturated, primary hydrocarbon groups and R" is a secondary hydrocarbon group.

18. A disubstituted malonic ester according to claim 1 wherein R is an ethyl group, R' is a primary hydrocarbon group and R" is a secondary hydrocarbon group.

19. A disubstituted malonic ester according to claim 1 wherein R is an ethyl group, R' is a saturated, primary hydrocarbon group, and R" is a secondary hydrocarbon group.

20. A disubstituted malonic ester according to claim 1 wherein R is an ethyl group, R' is a saturated, primary hydrocarbon group and R" is an isopropyl group.

21. A disubstituted malonic ester according to claim 1 wherein R and R' are both ethyl groups and R" is a secondary hydrocarbon group.

22. n-Butylthioethylidene ethyl malonic ester, having the formula:

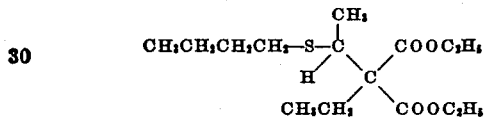

23. Isopropylthioethylidene n-propyl malonic ester, having the formula:

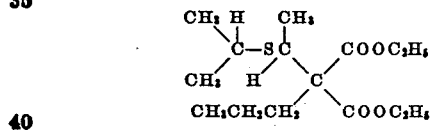

24. Ethylthioisobutylidene ethyl malonic ester, having the formula:

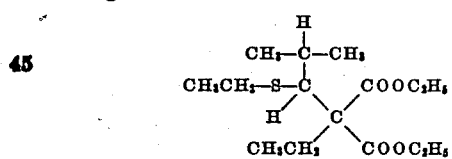

25. The process of producing a disubstituted malonic ester according to claim 1, which comprises treating approximately one mole of an α-chlorosulfide of the type:

with a sodio malonic ester of the type:

in an anhydrous organic solvent and thereafter recovering the resulting disubstituted malonic ester reaction product.

LEWIS A. WALTER.
LOUIS H. GOODSON.

CERTIFICATE OF CORRECTION.

Patent No. 2,354,234.                          July 25, 1944.

LEWIS A. WALTER, ET AL.

It is hereby certified that error appears in the printed specification of the above numbered patent requiring correction as follows: Page 2, line 28, in the table, for the words "Malonic acid" read --Malonic ester--; page 3, first column, line 17, claim 2, for " R and R' " read --R' and R"--; and that the said Letters Patent should be read with this correction therein that the same may conform to the record of the case in the Patent Office.

Signed and sealed this 14th day of November, A. D. 1944.

Leslie Frazer (Seal)                          Acting Commissioner of Patents.